United States Patent [19]

Ketley

[11] 4,299,354
[45] Nov. 10, 1981

[54] MIXING VALVES

[75] Inventor: Keith H. Ketley, Birmingham, England

[73] Assignee: Akerman & Jeavons (Birmingham) Ltd., Birmingham, England

[21] Appl. No.: 178,072

[22] Filed: Aug. 13, 1980

[30] Foreign Application Priority Data

Oct. 31, 1979 [GB] United Kingdom ............... 37806/79

[51] Int. Cl.³ ............................................ G05D 23/13
[52] U.S. Cl. ............................... 230/12 A; 236/93 A; 137/625.4
[58] Field of Search ............... 236/12.16, 12.21, 93 A, 236/12.23, 12.2; 251/362; 137/625.4, 625.5

[56] References Cited

U.S. PATENT DOCUMENTS

| 2,400,615 | 5/1946 | Warrick et al. | 236/93 A X |
| 3,388,861 | 6/1968 | Harding | 236/12.2 |
| 3,394,687 | 7/1968 | Scott | 137/625.4 X |
| 3,476,314 | 11/1969 | Boyd | 236/12.23 |
| 3,929,283 | 12/1975 | Delpla | 236/12.2 |
| 3,955,759 | 5/1976 | Knapp | 137/625.4 X |
| 4,029,256 | 6/1977 | Dauga | 236/12.2 |
| 4,164,321 | 8/1979 | Riis | 236/12.2 |

FOREIGN PATENT DOCUMENTS 1550412 9/1969 Fed. Rep. of Germany .
1953646 5/1970 Fed. Rep. of Germany .
1441242 6/1976 United Kingdom .

Primary Examiner—William E. Tapolcai, Jr.

[57] ABSTRACT

A thermally operated mixing valve including a single control knob, a valve member, a thermally responsive control member, and means for positively shutting off the flow of mixed liquid from a mixing chamber when the valve is closed.

The valve member is a "jumper" element movable in opposite directions in the control chamber to restrict or cut off the flow of hot or cold liquid respectively. The valve member can abut against a spring loaded annular abutment ring to shut off the flow of hot liquid to the mixing chamber and when the abutment ring reaches the limit of its travel the valve member can move away from it to allow hot liquid to flow to the mixing chamber around the outside of said valve member.

7 Claims, 7 Drawing Figures

MIXING VALVES

The invention relates to mixing valves and has for its object to provide an improvement therein.

Thermally operated mixing valves are wellknown and in some cases comprise a single control knob rotatable to steplessly vary the temperature of the output between OFF, COLD and HOT positions, a valve member and a thermally responsive control member, the valve member being arranged to control the flow of hot liquid and cold liquid to a mixing chamber, means being provided for positively shutting off the flow of hot liquid to the mixing chamber during an initial opening movement of the valve, and further means being provided for positively shutting off the flow of mixed liquid from said mixing chamber when the valve is closed. In one known thermally operated mixing valve of the kind referred to above, the means provided for positively shutting off the flow of hot liquid to the mixing chamber whenever the valve is closed include a slidably disposed abutment member on which an end of the valve member can seat, the abutment member being acted upon by a spring which normally acts to urge it into engagement with a fixed shoulder. However previously known mixing valves very often do not operate in an entirely satisfactory manner and it is thought that the major reason for this is that the valve member needs to move through a considerable distance. Another reason may be the fact that the valve member has been constituted by a spool type valve member extending slidably through a fluid tight seal and it is possible that in some cases such an arrangement could be prone to sticking. Consequently, it is frequently found that previously known mixing valves cannot maintain the pre-set temperature of the flow of mixed liquid from the valve within the required closely controlled limits, that is to say within the now commonly required limits of plus or minus 2° C. of the pre-set temperature. In the case of thermally operated mixing valves used as shower fittings, particularly those used in hospitals, it is of the utmost importance that they should operate satisfactorily and maintain the pre-set temperature without fail within such close limits, and of course to shut off the water supply completely in the event of a failure of, for example, the cold water supply so as to protect the user from being scalded.

According to the invention, there is provided a thermally operated mixing valve including a single control knob, a valve member and a thermally responsive control member, said valve member being arranged to control the flow of hot liquid and cold liquid to a mixing chamber, and including means for positively shutting off the flow of mixed liquid from said mixing chamber when the valve is closed, the valve member being constituted by a "jumper" element movable in opposite directions in a control chamber to restrict or cut off the flow of hot or cold liquid respectively to the mixing chamber, the valve member abutting against a slidably mounted, spring loaded, annular abutment ring to positively shut off the flow of hot liquid to the mixing chamber when the valve is closed, the arrangement being such that when the valve is opened and the annular abutment ring reaches the limit of its travel, the "jumper" element constituting the valve member moves away from the abutment ring and hot liquid is able to flow to the mixing chamber around the outside of said "jumper" element.

In order that the invention may be fully understood and readily carried into effect, the same will now be described, by way of example only, with reference to the accompanying drawings, of which:

Figure 1:
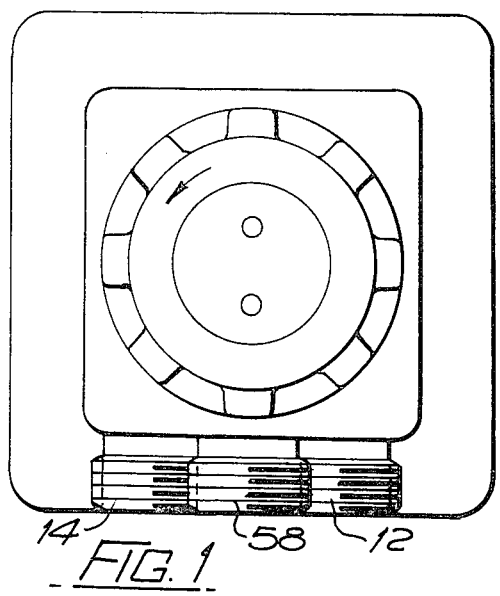
FIG. 1 is a front view of a mixing valve embodying the invention.
Figure 2:
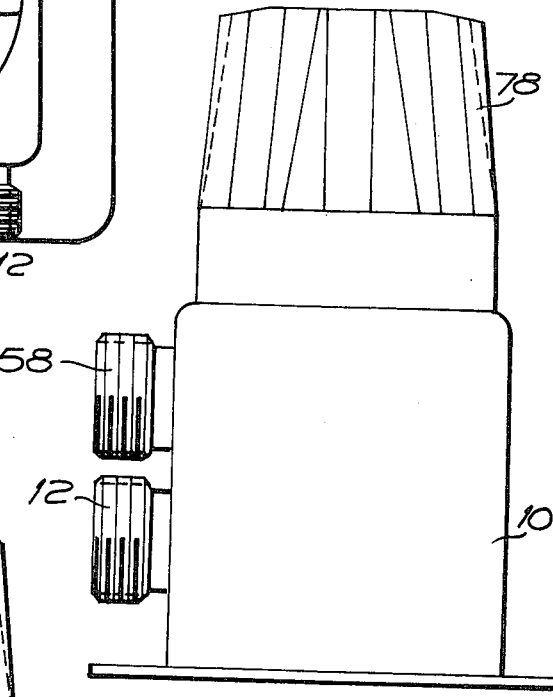
FIG. 2 is a side view thereof.
Figure 3:
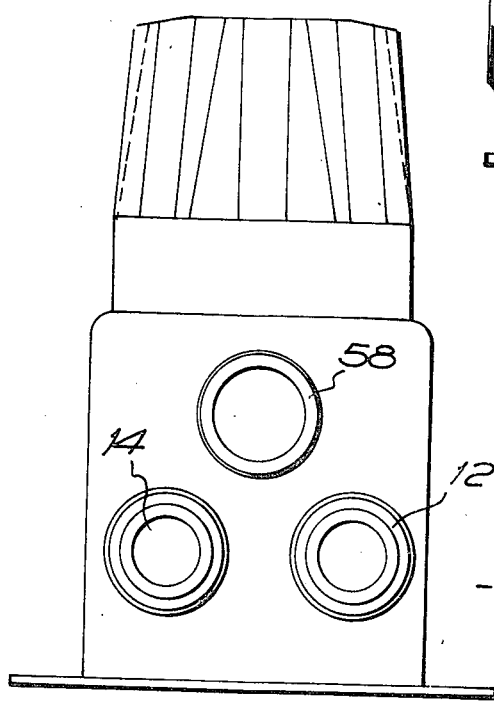
FIG. 3 is a view from beneath.

Referring now to the drawings, the thermostatically controlled mixing valve there illustrated is provided with an outer body part 10 having an inlet cold water passage 12 and an inlet hot water passage 14 both of which are adapted for the connection of respective conduits (not shown) carrying cold and hot water. The inlet passage 12 communicates with an annular chamber 16 which is cored out within the body, and the inlet passage 14 communicates with an annular chamber 18 also cored out within the body, the two chambers being separated from direct communication with each other by a generally cylindrical element 20 which forms a so-called cartridge body. One end of the element 20 is externally screwthreaded and engages a screwthreaded inner portion 22 of a cylindrical cavity within the body, whilst circumferential grooves which encircle said element accommodate respective O-ring seals 24 and 26 which engage respective spaced portions of the cylindrical cavity as shown.

A cylindrical bore 28, and a very slightly larger diameter counterbore 30, open from the inner end of the cartridge body, that is to say from the end which is screwthreaded in the body. A valve member 32 of somewhat smaller diameter than the bore 28 is located within the latter, the valve member being constituted by a so-called "jumper" element and in this illustrated embodiment being formed as a flat plate. An annular abutment ring 34 is located within the counterbore 30 but this is provided with a circumferential groove in which is accommodated an O-ring seal 36, the latter being a sliding fit in the counterbore.

The valve member 32 is carried by a guide pin 38 which at one end engages a spring guide 40 and which at its other end engages a cartridge pin 42. The cartridge pin is slidably disposed in an axial bore which extends through a central formation generally indicated 43 within the element 20. A coil compression spring 44 encircles the spring guide 40, as shown, and serves to urge the valve member away from the base of the valve body, that is to say towards the right as viewed in FIGS. 4 to 7. A coil compression spring 46 which surrounds the spring 44 to urge the annular abutment ring 34 in the same direction, that is to say into abutment with the shoulder at the junction of the bore 28 and counterbore 30 (or in certain circumstances into abutment with the valve member 32 as will presently be described).

Figure 4:
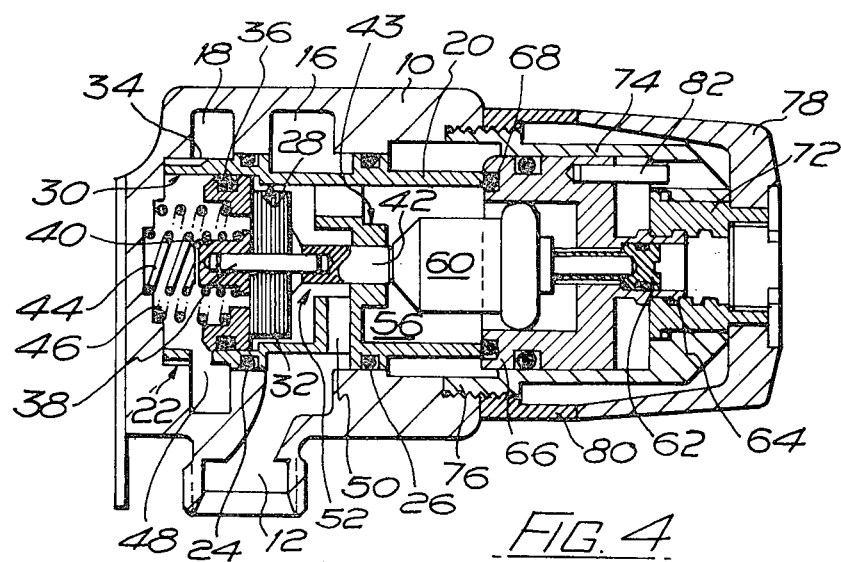
FIGS. 4 to 7 are longitudinal sectional views, illustrating the valve in successive positions, that is to say a closed condition, an initially fully opened HOT condition, a fully open but temperature stabilised condition, and a COLD condition.
Figure 5:
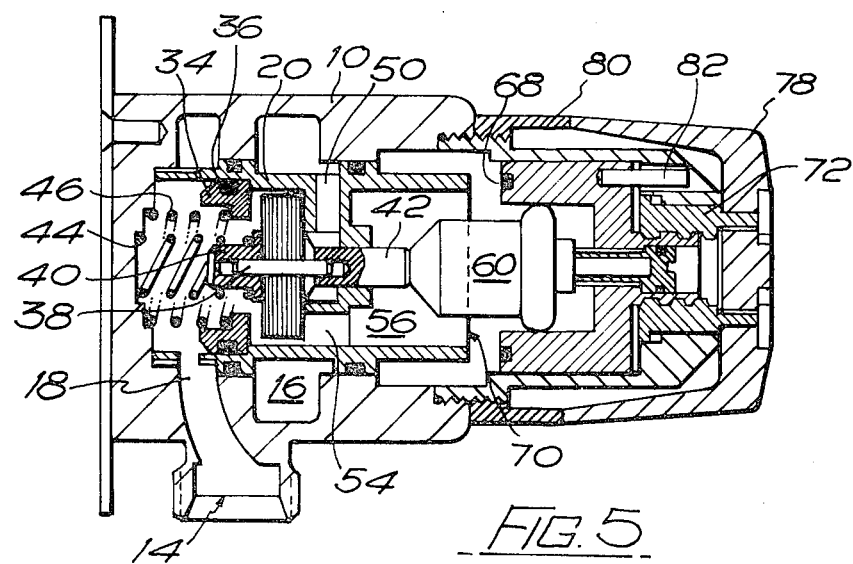
Figure 7:
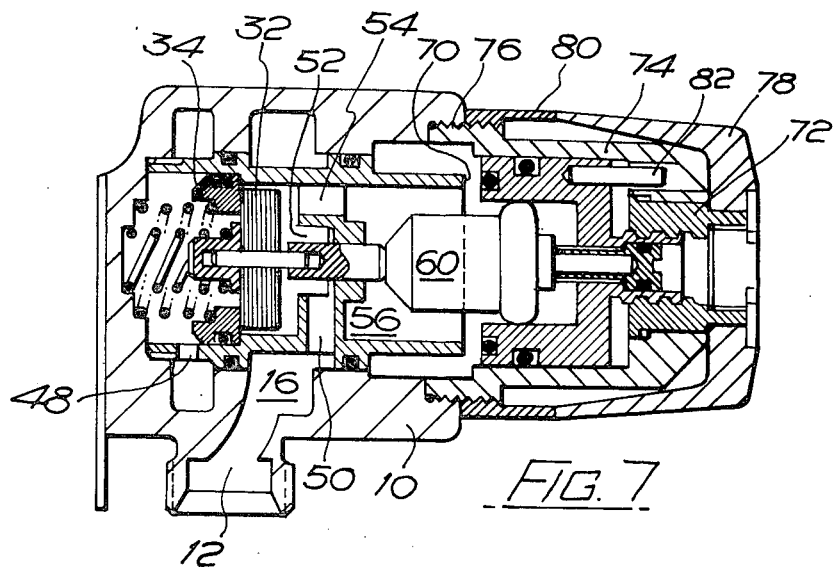

A plurality of radial ports 48 extend through the wall of the element 20 and allow hot water to communicate with a hot water chamber constituted by the space beneath the annular abutment ring 34, that is to say at the side of the abutment ring remote from the valve member, and the arrangement is such that hot water cannot flow from said hot water chamber when the valve member is seated against said annular abutment ring as shown in FIGS. 4 and 7. Similarly, a plurality of radial ports 50 extend through the wall of the element 20 and allow cold water to communicate with a counterbore 52 on the side of the valve member remote from the abutment ring, the arrangement being such that the flow of cold water from said counterbore, constituting a cold water chamber, is prevented when the valve member is fully displaced away from the abutment ring as shown in FIG. 5.

A plurality of flow passages 54 extend through the formation 43 referred to and serve to allow hot water flowing from the hot water chamber and around the valve member, and/or cold water flowing from the cold water chamber, to communicate with a mixing chamber 56 which is formed by an open ended portion of the element 20. When the valve is open, as in each of FIGS. 5, 6 and 7, the mixed water can communicate with an outlet pipe adaptor member 58 which extends through the wall of the body (see FIG. 6).

A thermally responsive control member 60 is accommodated partially within the mixing chamber 56 and abuts at one end against the cartridge pin 42 which itself bears against the valve member 32. The other end of the control member 60 abuts against an adjusting screw 62 which is carried by a valve spindle 64, the latter being formed integrally with a valve shut-off member 66 which carries an O-ring seal 68 in an annular end face, the arrangement being such that when the valve spindle and shut-off member are displaced towards the cylindrical element 20 from the position in which they are shown in each of FIGS. 5, 6 and 7, the O-ring seal abuts against the annular end face 70 of the element 20 which forms a valve seating. Consequently, as shown in FIG. 4, the flow of water from the mixing chamber is positively shut off. In this position also it will be seen that the valve member 32 has displaced the annular abutment ring 34 away from the shoulder which it normally engages.

The valve spindle 64 is externally screwthreaded and engages a nut 72 which is rotatably mounted but axially located within a valve head element 74 a screwthreaded skirt portion 76 of which engages an internal thread in the body 10. A control knob 78 which is secured to an outwardly projecting part of the nut has a skirt portion which encircles the outermost part of the valve head element and abuts against a spacer ring 80 engaging a projecting part of the screwthreaded skirt portion 76. A dowel pin 82 which projects from the valve shut-off member 66 is slidably located within a clearance hole in the valve head element 74 and serves to hold the valve shut-off member and valve spindle against rotation. Consequently, when the control knob is turned, the valve shut-off member and the thermally responsive control member 60 are displaced axially in a direction dependent upon the direction of rotation of the knob. The knob can be turned steplessly in anti-clockwise direction from a position in which it indicates "OFF" to successive positions in which water being delivered is cold and then hot. Abutment means, not shown, are provided to limit the rotation of the knob in each direction.

Figure 6:
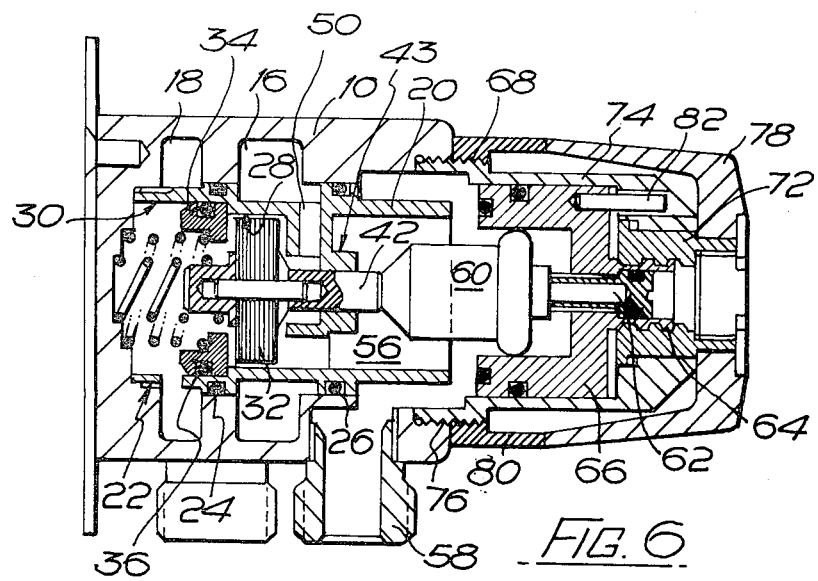

In operation, when a person wishing to take a shower opens the valve, he opens it fully to the "HOT" position. Assuming the thermally responsive control member 60 to have previously been in cold condition, i.e. retracted, the result will be the initial displacement of the valve member 32 fully to the right as shown in FIG. 5. In this position, it will be seen that the valve member almost totally blanks off the flow passages 54 and does in fact totally blank off the flow of cold water from the counterbore 52. However, a restricted flow of hot water is able to take place through radially outer portions of the flow passages and this is able to impinge upon the thermally responsive control member 60. Consequently, the control member immediately expands to displace the valve member slightly to the left and to bring the temperature of the liquid flow from the valve to the pre-set required temperature. This stabilized condition is illustrated in FIG. 6.

It will be observed that a very small movement of the valve member away from the formation 43 converts a very much restricted flow through the flow passages into full flow and it has been found that this gives the valve very desirable characteristics, that is to say, as the pre-set temperature is achieved the full flow through the valve is automatically established. (It will of course be understood that the valve is intended to be connected to a hot water supply of somewhat higher temperature than the pre-set required "HOT" temperature so that in fact there is always some flow of cold water whereby full flow can be maintained).

It has also been found that the valve reacts very quickly indeed to any changes in the flow rate or of the temperature of either water supply, that is to say of either the cold or hot water. Consequently, the valve is very safe in operation, so much so that it has been found virtually impossible for a person to be scalded by a sudden discharge of hot water or shocked by a sudden discharge of cold water.

It is of course possible to adjust the valve so that cold water only is delivered. This condition is illustrated in FIG. 7 where the valve member is shown to have been displaced towards the left so that it abuts against the annular abutment ring 34.

When the valve is closed completely to bring the shut-off member 66 into abutment with the annular end face 70 of the element 20, that further movement of the shut-off member displaces the valve member through that same further distance to displace the annular abutment ring 34 from engagement with the shoulder against which it normally bears. In this condition of the valve, the hot and cold water supplies are completely isolated so that it is impossible for "migration" of water to occur, that is to say impossible for the hot water supply to flow back into a cold water supply.

Thus there is provided a construction of thermally operated mixing valve which has been found to operate in a very satisfactory manner, that is to say which has been found to maintain a pre-set temperature within very closely controlled limits and to react instantaneously to a failure or restriction of one or the other of the hot and cold water supplies to the valve (such failure being due perhaps to a burst main or more commonly to some other demand for water having priority). It is thought that the reason for the excellent performance of this valve is the fact that the valve member is constituted by a so-called "jumper" element which as previously explained requires to move through a very small distance to adjust the temperature of the water being delivered.

Various modifications may be made. For example, it is not essential that the outlet for mixed water should be at the underside of the valve as in the illustrated embodiment. It would be quite a simple matter to arrange for the outlet to be from the top side of the valve body. Similarly, the inlet passages need not necessarily open at the underside of the valve; for example they could open from opposite side surfaces of the valve body.

What I claim and desire to secure by Letters Patent is:

1. In a thermally operated mixing valve, a single control knob; a mixing chamber; a control chamber; a thermally responsive control member accommodated at least partly in said mixing chamber; means for positively shutting off the flow of mixed liquid from said mixing chamber when the valve is closed; a slidably mounted spring loaded abutment ring; and a valve member arranged to control the flow of hot liquid and cold liquid to said mixing chamber, said valve member being constituted by a "jumper" element movable in opposite directions in said control chamber to restrict or cut off the flow of hot or cold liquid respectively to said mixing chamber, the valve member abutting against said spring loaded annular abutment ring to positively shut off the flow of hot liquid to said mixing chamber when the valve is closed, the arrangement being such that when the valve is opened and the annular abutment ring reaches the limit of its travel, the "jumper" element constituting the valve member moves away from the abutment ring and hot liquid is able to flow to the mixing chamber around the outside of said "jumper" element.

2. A thermally operated mixing valve according to claim 1, including a cylindrical element constituting a so-called cartridge body located in an outer body part of the valve, one end of said cylindrical element being externally screwthreaded and engaging a screwthreaded inner portion of a cylindrical cavity within said outer body part, a cylindrical bore and a somewhat larger counterbore opening from the inner end of said cartridge body, the valve member, which is of somewhat smaller diameter than said bore, being located in said bore, and the annular abutment ring being slidably located within said counterbore.

3. A thermally operated mixing valve according to claim 2, in which the cartridge body is provided with a central formation between the control chamber in which the valve member is accommodated and the mixing chamber constituted by an open ended portion of said cartridge body in which the thermally responsive control member is at least partly accommodated, said central formation being formed with a plurality of flow passages which serve to allow hot water flowing from a hot water chamber and around the valve member, and/or cold water flowing from a cold water chamber, to communicate with the mixing chamber.

4. A thermally operated mixing valve according to claim 2, in which the thermally responsive control member abuts at one end against a cartridge pin which itself bears against the valve member, the other end of the control member abutting against an adjusting screw carried by a valve spindle.

5. A thermally operated mixing valve according to claim 4, in which the valve spindle is formed integrally with a valve shut-off member an annular portion of which can abut against an end face of the cartridge body to constitute the means for positively shutting off the flow of mixed liquid from the mixing chamber when the valve is closed.

6. A thermally operated mixing valve according to claim 4, in which the valve spindle is non-rotatable, the arrangement being such that when the control knob is turned, the valve spindle and thermally responsive control member are displaced axially in a direction dependent upon the direction of rotation of the knob.

7. A thermally operated mixing valve according to claim 6, in which abutment means are provided to limit the rotation of the knob in each direction.

* * * * *